United States Patent
Tanaka et al.

(10) Patent No.: US 7,045,093 B2
(45) Date of Patent: May 16, 2006

(54) METHOD FOR MANUFACTURING SINTERED MAGNET

(75) Inventors: Atsuo Tanaka, Hyogo (JP); Shoichi Matsugami, Hyogo (JP); Tadahiro Iwasaki, Hyogo (JP); Atsushi Ogawa, Osaka (JP); Hitoshi Morimoto, Hyogo (JP)

(73) Assignee: Neomax Co., Ltd. (JP)

( * ) Notice: Subject to any disclaimer, the term of this patent is extended or adjusted under 35 U.S.C. 154(b) by 111 days.

(21) Appl. No.: 10/399,252

(22) PCT Filed: Jul. 26, 2002

(86) PCT No.: PCT/JP02/07643

§ 371 (c)(1),
(2), (4) Date: Apr. 16, 2003

(87) PCT Pub. No.: WO03/011793

PCT Pub. Date: Feb. 13, 2003

(65) Prior Publication Data
US 2004/0045637 A1 Mar. 11, 2004

(30) Foreign Application Priority Data

Jul. 31, 2001 (JP) .................... 2001-230974
Feb. 5, 2002 (JP) .................... 2002-028525

(51) Int. Cl.
*B22F 3/00* (2006.01)
*B26D 1/44* (2006.01)
*B23P 13/04* (2006.01)

(52) U.S. Cl. .................. 419/44; 148/101; 264/118; 29/557; 83/651.1

(58) Field of Classification Search ................ 419/44; 148/100, 101; 264/118; 29/557; 83/651.1

See application file for complete search history.

(56) References Cited

U.S. PATENT DOCUMENTS

| | | | | |
|---|---|---|---|---|
| 4,457,851 A | * | 7/1984 | Tabaru et al. ............ | 252/62.63 |
| 5,201,305 A | * | 4/1993 | Takeuchi .................... | 125/21 |
| 5,383,978 A | | 1/1995 | Yamamoto et al. | |
| 6,054,422 A | * | 4/2000 | Ward et al. ................ | 508/579 |
| 6,194,068 B1 | * | 2/2001 | Ohashi et al. ............. | 428/379 |
| 6,381,830 B1 | * | 5/2002 | Chikuba et al. ........... | 29/557 |

FOREIGN PATENT DOCUMENTS

| | | |
|---|---|---|
| EP | 0 983 831 | 3/2000 |
| JP | 63-33505 | 2/1988 |
| JP | 08-64451 | 3/1996 |
| JP | 08-181028 | 7/1996 |
| JP | 09-059666 | 3/1997 |
| JP | 10-193322 | 7/1998 |
| JP | 11-329877 | 11/1999 |
| JP | 2001-138205 | 5/2001 |

OTHER PUBLICATIONS

Examiner: Masafumi Yamada, Notice of Reasons for Rejections for Patent Application No. JP-2002-215946, Mailed Oct. 19, 2004.

* cited by examiner

*Primary Examiner*—Ngoclan T. Mai
(74) *Attorney, Agent, or Firm*—Nixon Peabody LLP; Jeffrey L. Costellia

(57) ABSTRACT

A method for manufacturing a sintered magnet includes the steps of producing a green compact of powder for the sintered magnet, machining the green compact with a wire-saw, and sintering the green compact.

15 Claims, 12 Drawing Sheets

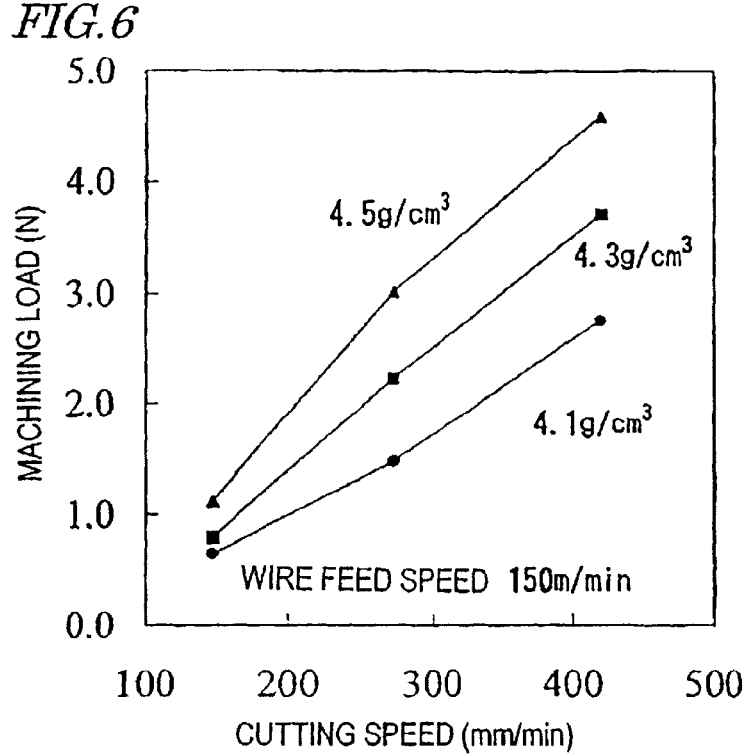

FIG. 7A
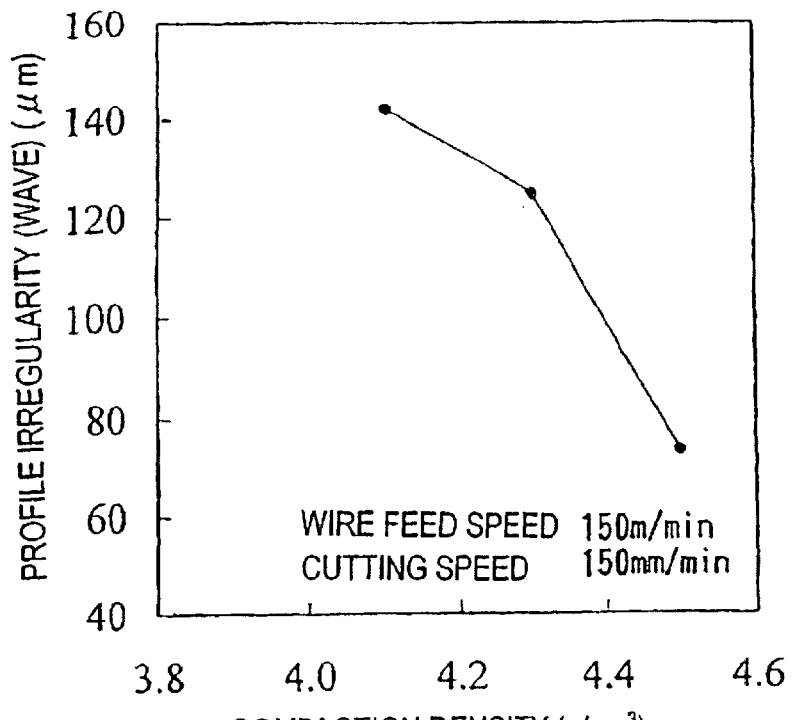
FIG. 7B
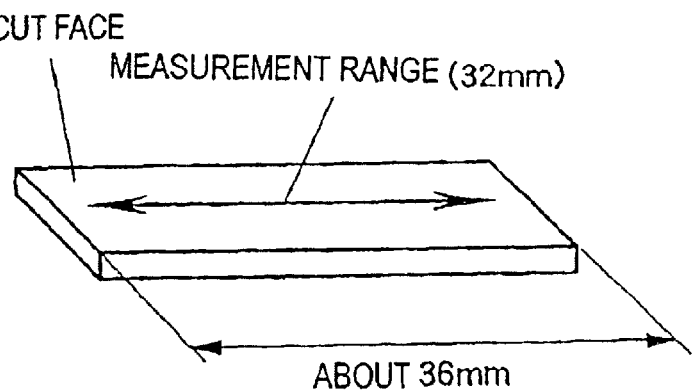
MEASUREMENT OF SURFACE STATE WITH A PROFILE MEASURING DEVICE
FIG. 7C
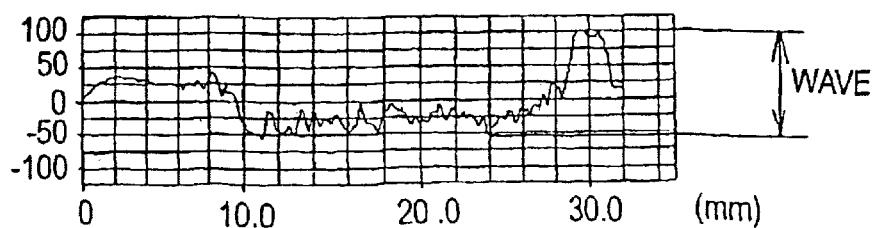

METHOD FOR MANUFACTURING SINTERED MAGNET

TECHNICAL FIELD

The present invention relates to a method for manufacturing a sintered magnet.

BACKGROUND ART

A rare earth sintered magnet is manufactured by pulverizing a rare earth magnetic alloy (material alloy) into alloy powder, compacting the alloy powder to obtain a green compact, sintering the green compact and subjecting the sintered body to an aging treatment, machining and other such processes. Currently, as rare earth sintered magnets, two types of magnets, rare earth-cobalt type magnets and rare earth-iron-boron type magnets, are used extensively in various fields of applications. Among others, rare earth-iron-boron type magnets (which will be referred to herein as "R—Fe—B type magnets" wherein R is at least one type of element selected from the group consisting of rare earth elements and yttrium, Fe is iron, and B is boron) are used more and more often in various types of electronic appliances because the R—Fe—B type magnets exhibit a magnetic energy product that is higher than any of other various types of magnets and yet are relatively inexpensive. A transition metal element such as Co may be substituted for a portion of Fe. Also, carbon may be substituted for up to one half of boron.

To manufacture a sintered magnet having a desired shape, R—Fe—B type rare earth magnet powder (i.e., rare earth alloy powder) is first compacted with a press, to obtain a green compact having a size that is larger than that of a final magnet product. The green compact is sintered, and the resultant sintered body is ground or cut with a cemented carbide saw blade, a rotary grindstone or the like to render the sintered body to have a desired shape. For example, a sintered body is first manufactured as a block, and the block is then sliced with a saw blade or the like to obtain a plurality of sintered plates.

A sintered body of a rare earth alloy magnet such as a R—Fe—B type magnet is very rigid and brittle and has a large machining load. Therefore, high-precision grinding of such a sintered body requires hard work and takes long time. For this reason, the machining process is a major cause of increases in the production cost and time thereof.

To solve the above problem, grinding of a green compact before sintering has been proposed, for example, in Japanese Laid-Open Patent Publication No. 8-64451 and No. 8-181028.

Japanese Laid-Open Patent Publication No. 8-64451 discloses a technique of chamfering a green compact for a bow ferrite magnet with a rotary grindstone or a rotary brush. If this technique is applied to a green compact for a R—Fe—B type magnet that is highly susceptible to oxidation, the following problem may occur. Friction heat is generated between a rotary grindstone or a rotary brush and the green compact, and this may cause rapid reaction of a rare earth element and iron in the green compact with oxygen and water in the atmosphere. As a result, ignition of the green compact may possibly occur in the worse case. Even if the worst case is avoided, the magnetic properties of the magnet will be deteriorated.

Japanese Laid-Open Patent Publication No. 8-181028 discloses a technique of preventing oxidation of a green compact during machining thereof, in which the green compact is immersed in mineral oil, synthetic oil or plant oil, and is cut with a rotating blade in the immersed state.

This technique indispensably requires a process step for removing the mineral oil or other substances from the green compact after the cutting and before sintering. If degreasing is insufficient, carbon contained in the oil acts as an impurity in the sintering process, and this deteriorates the magnetic properties.

In addition, in the cutting with a saw blade and the like, a large cutting clearance is required for the green compact, and this decreases the yield of the material.

DISCLOSURE OF INVENTION

In order to overcome the problems described above, preferred embodiments of the present invention provide a method for manufacturing a sintered magnet in which the machining load is greatly reduced and heat generation in the green compact is minimized.

The method for manufacturing a sintered magnet according to preferred embodiments of the present invention includes the steps of producing a green compact of powder for the sintered magnet, machining the green compact with a wire-saw, and sintering the green compact.

In a specific preferred embodiment of the present invention, the wire-saw includes a wire having an outer diameter in a range of about 0.05 mm to about 3.0 mm and abrasive grains fixed to the wire.

In another preferred embodiment of the present invention, the step of machining the green compact includes the step of slicing the green compact into a plurality of parts.

The step of machining the green compact preferably includes the steps of slicing the green compact while forming cut surfaces by relatively moving the green compact with respect to the wire-saw, and relatively moving the wire-saw again along the cut surfaces.

Preferably, the relative movement in the step of machining the green compact is performed in a horizontal plane, and the method may further include the step of separating the plurality of parts obtained in the step of slicing the green compact in a substantially perpendicular direction.

Preferably, the method further includes the step of applying anti-fusing powder to a gap between the plurality of parts after the step of machining the green compact.

In a preferred embodiment of the present invention, the step of machining the green compact is performed in an inert gas atmosphere having an oxygen concentration in a range of about 5% to about 18% in mole ratio.

In another preferred embodiment of the present invention, the step of machining the green compact is performed with a cutting fluid (or liquid lubricant) applied to at least a portion of the wire-saw that contacts the green compact.

The cutting fluid preferably includes a hydrocarbon base organic solvent.

The hydrocarbon base solvent preferably includes isoparaffin.

Preferably, the cutting fluid is a dispersion that includes anti-fusing powder.

Preferably, the cutting fluid is applied to the wire-saw by immersion, dropping or spraying, or other suitable process.

The green compact may be machined in the cutting fluid.

In a preferred embodiment of the present invention, the step of producing a green compact includes the step of adding a lubricant to the powder for the sintered magnet.

In another preferred embodiment of the present invention, the powder for the sintered magnet has residual magnetization in a range of about 0.001 T to about 0.1 T.

In still another preferred embodiment of the present invention, the powder for the sintered magnet is powder of a R-T-B type rare earth alloy (R is at least one type of element selected from the group consisting of rare earth elements and yttrium, T is a transition metal element including iron, and B is boron). The average particle size (FSSS particle size) of the powder for the sintered magnet is preferably in the range of about 2.0 µm to about 8.0 µm.

Other features, elements, characteristics, steps and advantages of the present invention will become more apparent from the following detailed description of preferred embodiments with reference to the attached drawings.

BRIEF DESCRIPTION OF DRAWINGS

FIG. 6 is a graph showing the cutting speed dependence of the machining load observed when a lubricant is added.

FIG. 7A is a graph showing the relationship between the profile irregularity (wave) of a cut surface after sintering and the compaction density.

FIG. 7B is a perspective view illustrating a wave measurement range (about 32 mm) on the cut surface of FIG. 7A.

FIG. 7C is a graph showing measurement data (step data) of the wave of FIG. 7A.

BEST MODE FOR CARRYING OUT THE INVENTION

Figure 1:
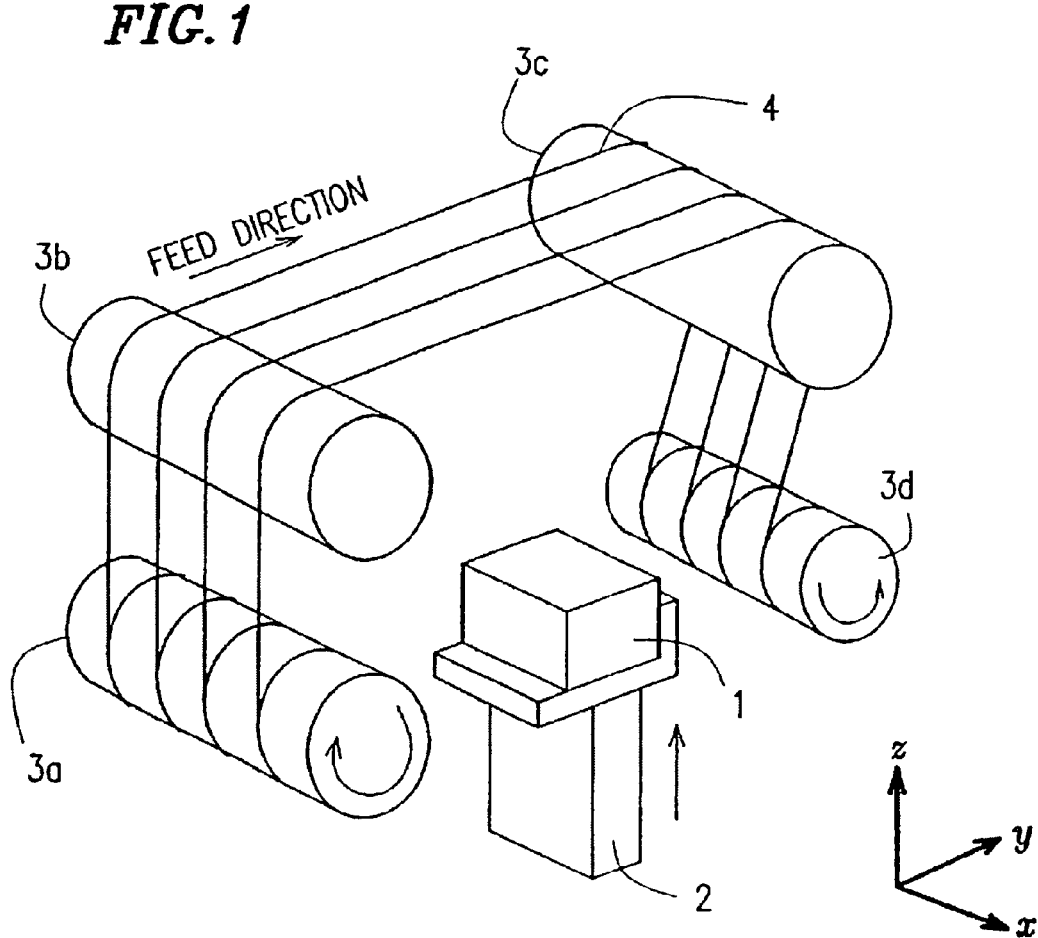
FIG. 1 illustrates an exemplary construction of a wire-saw machine suitably used for preferred embodiments of the present invention.

According to the present invention, a green compact of powder for a sintered magnet is machined by wire-sawing before sintering. The wire-sawing is a technique of machining a green compact, in which a wire traveling in one direction or in opposite directions is pressed against the green compact to be machined so that the green compact is machined with abrasive grains existing between the wire and the green compact.

The inventors of the present invention discovered that in the machining of a green compact of rare earth alloy powder which is susceptible to oxidation before sintering, the problem of heat generation and ignition that may occur when a normal rotary blade or other such tool is used, can be avoided by using the wire described above. The present invention has been developed based on this and other discoveries.

In a preferred embodiment of the present invention, a wire with abrasive grains fixed to the surface thereof is preferably used. The core wire is preferably made of a material having high tensile strength. For example, the core wire may be made of a hard-drawn metal wire (piano wire), an alloy such as Ni—Cr and Fe—Ni, a metal having a high melting point such as W and Mo, or a bundle of nylon fibers. If the wire is excessively thick, the cutting clearance is large and this decreases the yield of the material. On the contrary, if the wire is excessively thin, the wire may possibly break due to the machining load. Moreover, the cutting resistance increases and this may cause heat generation and ignition. In consideration of the above, the outer diameter of the wire used according to preferred embodiments of the present invention is preferably in the range of about 0.05 mm to about 3.0 mm, more preferably in the range of about 0.1 mm to about 1.0 mm. The wire-saw as used herein broadly includes a cutting member having a width in the cutting direction of about 3.0 mm or less, including, for example, a band-saw having a width (or height) of about 3.0 mm or less.

The abrasive grains are preferably made of a material having high hardness, such as diamond, SiC and alumina The particle size is typically in the range of about 10 µm to about 1000 µm. The abrasive grains are preferably fixed to the surface of the core wire via a bonding layer such as a resin layer. As the resin layer, a phenol resin, an epoxy rein or a polyimide resin may be used. The thickness of the resin layer is preferably about 0.02 mm to about 1.0 mm.

As the bonding layer, a metal layer may be used in place of the resin layer for fixing the abrasive grains. For example, a wire with abrasive grains fixed thereto by electrodeposition or electroplating (hereinafter, also called "electrodeposited grain wire") is preferred for its excellent discharge efficiency of saw dust (powder or sludge). That is, the protruding amount of abrasive grains (the height of a portion of the abrasive grains protruding from the surface of the bonding layer) can be made larger when the electrodeposited grain wire is used than when a wire with abrasive grains fixed via a resin layer is used. If sufficient strength is secured, a stranded wire may be used. Use of a stranded wire can further improve the discharge efficiency of saw dust. In the case of using a cutting fluid for improvement of the discharge efficiency of saw dust as will be described later, the electrodeposited grain wire should preferably be used from the standpoint of resistance to the cutting fluid, in addition to the excellent discharge efficiency described above.

The average particle size D of the abrasive grains preferably satisfies the relationship 30 µm $\leq$ D $\leq$ 1000 µm. In particular, it preferably satisfies the relationship 40 µm $\leq$ D $\leq$ 200 µm. From the standpoint of the cutting efficiency and the discharge efficiency of saw dust, the average distance between adjacent abrasive grains in the wire-saw travel direction is preferably in the range of about 200% to about 600% of the average particle size D, and the protruding amount is preferably in the range of about 15 μm to about 500 μm.

The green compact is magnetized by an aligning magnetic field applied during compaction. Even when demagnetization is performed for the green compact for removing the magnetization, remanent magnetization of about 0.001 T to about 0.1 T still remains. Although further reduction of the remanent magnetization is possible, this increases the number of process steps and thus, is undesirable in mass production. Due to the remanent magnetization of the green compact, if the cutting clearance is small during cutting of the green compact with a wire-saw, saw dust attaches to cut surface and this makes it difficult to separate cut pieces of the green compact from each other. To avoid this problem, the cutting clearance is preferably about 0.1 mm or more.

A wire with no abrasive grains fixed to the surface thereof (free grain wire) may be used. When using this type of wire, however, saw dust is less easily discharged and relatively easily settled in a cut groove than when using a wire with abrasive grains fixed to the surface thereof (fixed grain wire). As a result, a larger amount of saw dust may attach to the cut surface due to the remanent magnetization described above. For this reason, use of a fixed grain wire is preferred, with which separation of cut pieces of the green compact is easier.

During slicing of the green compact into a plurality of pieces, the wire-saw may be relatively moved again along the once-formed cut surface to facilitate separation of the sliced pieces. By this re-passing of the wire-saw along the cut surface, saw dust remaining in the gap between the sliced pieces of the green compact can be discharged, and thus, the sliced pieces can be separated without occurrence of chipping. It is preferable to keep the gap between the sliced compact pieces for re-passing the wire-saw along the cut surface.

To improve the discharge efficiency of saw dust during the cutting process, the green compact may be cut with a cutting fluid applied to at least a portion of the wire-saw coming into contact with the green compact. By the application of a cutting fluid to the wire-saw, saw dust attaches to the wire-saw more easily, and also saw dust particles cling together more easily. As a result, a larger amount of saw dust attaches to the wire-saw and is discharged from the cut portion.

There was a concern that a non-sintered compact, which is low in mechanical strength, might be more easily broken with a cutting fluid. According to experiments conducted by the present inventors, however, there was observed no reduction in yield due to decreased strength that may be caused by use of a cutting fluid. On the contrary, the discharge efficiency of saw dust improves by use of a cutting fluid and cut pieces of the green compact can be separated from each other with high probability. As a result, the production process is greatly simplified, and the production yield is greatly improved.

For example, in cutting of a green compact in an arch shape of which the top and bottom surfaces have different curvatures, the green compact is cut so as to form cut surfaces in the plane including the substantially perpendicular direction when the green compact is placed on a support base (vertical cutting). Cut pieces of the green compact can be sintered as they are without being subjected to a process of separating the cut pieces from each other. Even by this direct sintering, the incidence of fusing of the compact pieces to each other is low. Therefore, a sufficient production yield is secured.

As a cutting fluid, a nonaqueous cutting fluid (organic solvent or oil-base fluid) is preferably used to prevent oxidation of the green compact. A preferred cutting fluid is a hydrocarbon base organic solvent that is not apt to remain in the sintered magnet as carbon. In particular, a saturated hydrocarbon base solvent (for example, isoparaffin and normal paraffin) is preferred because this type of solvent is easily removed. Moreover, a dispersion with anti-fusing powder dispersed in the cutting fluid may be used to ensure further effective prevention of fusing between the compact pieces after cutting.

The cutting fluid may be applied to the wire-saw by immersion, dropping or spraying, or other process. Otherwise, the green compact may be immersed in the cutting fluid and cut in the immersed state.

Hereinafter, various preferred embodiments of the present invention will be described with reference to the relevant drawings.

FIG. 1 illustrates an exemplary construction of a wire-saw machine according to Preferred Embodiment 1 of the present invention. The illustrated machine includes a drive device 2 supporting a green compact 1 to be machined for driving upward and downward (in the z-axis direction) and a plurality of rolls 3a, 3b, 3c and 3d.

A wire-saw 4, including a wire and abrasive grains fixed to the wire as described above, is wound in lines around the rolls 3a to 3d and travels in the direction that is substantially parallel to the y-axis. The lines of the wire-saw 4 are preferably arranged at substantially equal pitches in the x-axis direction, and the pitch of the arrangement (wire pitch) is arbitrarily determined depending on the size (thickness) of plates cut from the green compact 1 as a block. In a preferred embodiment of the present invention, the wire pitch is preferably about 1 mm to about 30 mm.

The outer diameter of the wire used for the wire-saw 4 is preferably in the range of about 0.05 mm to about 3.0 mm in consideration of the wire strength and the cutting clearance. If a rigid sintered body is cut with the wire-saw 4, a tension as large as about 20 N to about 40 N will be applied to the wire. According to preferred embodiments of the present invention, however, in which the soft green compact 1 before sintering is machined, a comparatively small tension of about 0.1 N to about 10 N is applied to the wire, and thus the cutting resistance is small. Therefore, the green compact can be cut and machined without causing a problem of ignition and oxidation even in an atmosphere having a comparatively high oxygen concentration.

An organic solvent such as isoparaffin and ethyl alcohol may be applied to the wire-saw 4 as a cutting fluid during the machining. The application of the cutting fluid is not required, but can improve the discharge efficiency of saw dust as will be described later.

The speed ($V_y$) of the wire-saw 4 in the y-axis direction is herein referred to as the "wire feed speed". The green compact 1 is pressed against the wire-saw 4 traveling at a predetermined wire feed speed, to be cut/divided (sliced) into a plurality of pieces. The speed ($V_z$) at which the green compact 1 is pressed against the wire-saw 4, which corresponds to the driving speed of the drive device in the z-axis direction in the illustrated example, is herein referred to as the "cutting speed". As the cutting speed is higher, the time required for machining is shorter.

The wire feed speed and the cutting speed are largely influenced by the value of the machining load as will be evident from examples to be described later. To put the machining load in a practically appropriate range, the cutting speed is preferably in the range of about 30 mm/min to about 1200 mm/min, more preferably about 30 mm/min to about 800 mm/min.

The wire-saw 4 may travel in a fixed direction or may reciprocate in the y-axis directions. In the latter case, a plurality of wires stretched over a substantially rectangular frame may be reciprocated linearly in the y-axis directions with an air cylinder or other suitable device. In place of the air cylinder, a device including a motor and a crank may be used.

Figure 2:
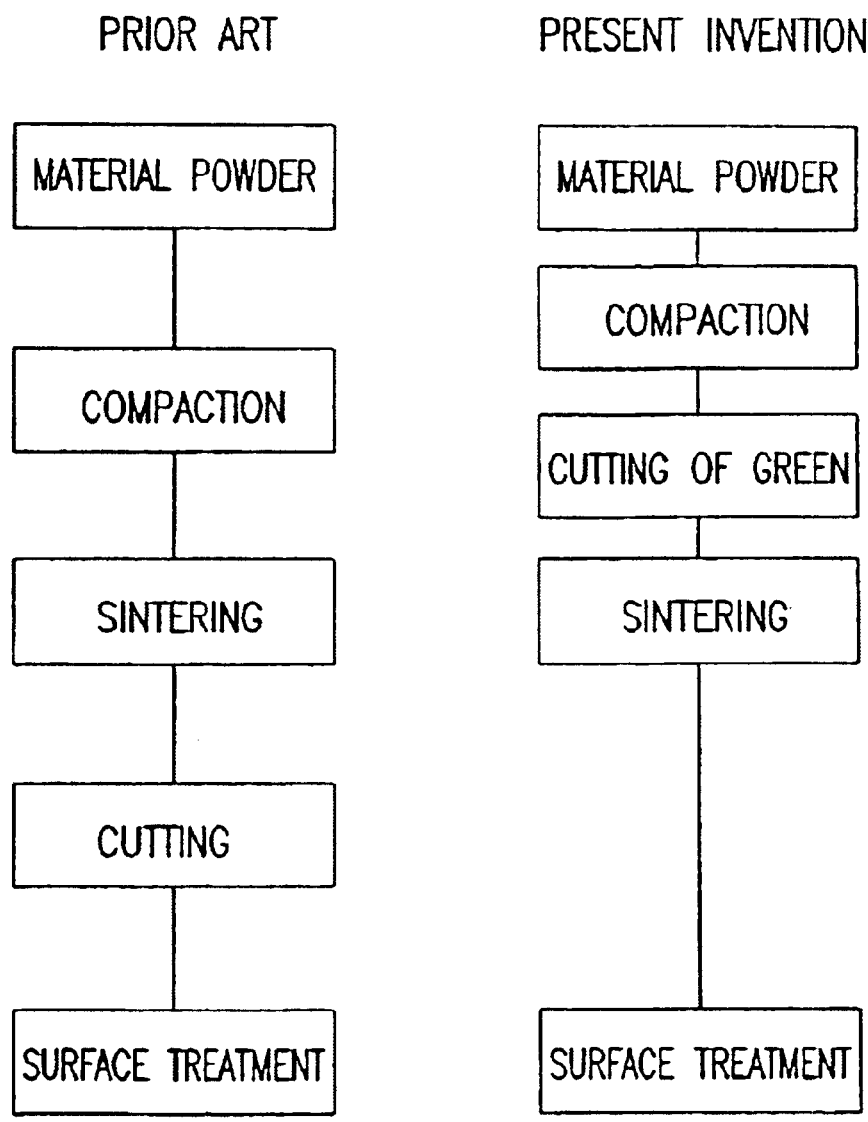
FIG. 2 is a flowchart distinguishing the cutting of a green compact before sintering according to preferred embodiments of the present invention from the conventional cutting of a sintered body, with respect to the number of manufacturing steps.

FIG. 2 is a flowchart distinguishing the cutting of a green compact before sintering according to preferred embodiments of the present invention from the conventional cutting of a sintered body, with respect to the number of manufacturing steps. As shown in FIG. 2, in the conventional process, it is necessary to perform the steps of preparing material powder, compacting the powder, sintering a green compact, cutting a sintered body, and subjecting cut pieces of the sintered body to surface treatment and other steps. In the process according to preferred embodiments of the present invention, after the compaction, the green compact is cut before sintering to make compact pieces having a shape and size close to those of final magnet products. In this way, according to preferred embodiments of the present invention, the green compact, which is very soft and easily machined compared with the sintered body, is cut. This greatly reduces the time required for the cutting.

According to preferred embodiments of the present invention, the contact area of the wire-saw with the green compact is small compared with the contact area of a conventional rotary blade with the green compact, and therefore the amount of heat generation due to friction is extremely small. For example, the contact area is as large as about 1000 mm$^2$ to about 10000 mm$^2$ in the case of using a conventional rotary blade, and the contact area is reduced to about 5 mm$^2$ to about 50 mm$^2$ according to preferred embodiments of the present invention. Thus, the problem of ignition and oxidation of rare earth alloy powder is reliably prevented even when wire-saw machining is performed in a normal atmosphere.

Note however that, to further suppress oxidation of magnet powder and attain high magnet properties, it is preferable to perform wire-saw machining in an inert gas atmosphere having an oxygen concentration of about 10% to about 15% in mole ratio when the oxygen concentration of the magnet powder exceeds approximately 3000 ppm by weight. In particular, when magnet powder having a low oxygen concentration of about 3000 ppm or less by weight is used for production of a green compact, the magnet powder exhibits significantly high oxidation reactivity. In this case, therefore, the wire-saw machining is desirably performed in an environment in which the oxygen concentration is more strictly limited than that described above (for example, in an inert gas atmosphere having an oxygen concentration of about 2% or less in mole ratio). Control of the oxygen concentration to within the range described above is possible by partially surrounding the machine for cutting, which is realized without the necessity of completely isolating the surroundings of the wire-saw machine from the atmosphere. In this way, when the green compact is cut in a gaseous atmosphere, the atmosphere is preferably controlled.

In addition, when a green compact is machined in a gaseous atmosphere as described above, a solid or cutting fluid (for example, a fatty ester) is preferably added to the magnet powder before compaction. With a film of the lubricant formed on the surface of the powder, oxidation of the powder is prevented. Alternatively, after production of a green compact, the green compact may be sufficiently impregnated with the lubricant before machining. As such a lubricant, preferred is a lubricant that can be easily removed from the green compact in the sintering process at a later stage.

In the conventional cutting with a rotary blade, the cutting clearance is large (for example, about 0.5 mm or more in width) and this causes sawdust to fly from the cut portion into the surroundings as dust particles in some cases. This will be very dangerous if such flying saw dust ignites. By using the wire-saw according to preferred embodiments of the present invention, flying of saw dust is greatly minimized and eliminated, thus safe manufacturing is ensured.

The wire-saw processing according to preferred embodiments of the present invention may also be performed in an organic solvent such as a saturated hydrocarbon base solvent represented by isoparaffin in the immersed state. Degreasing of such an organic solvent is easy. Therefore, the green compact can be degreased in a normal sintering process without the necessity of providing a special degreasing process. Thus, the problem that carbon in the organic solvent deteriorates the magnetic properties of the sintered magnet does not occur.

Hereinafter, an example of Preferred Embodiment 1 of the present invention will be described.

Figure 3:
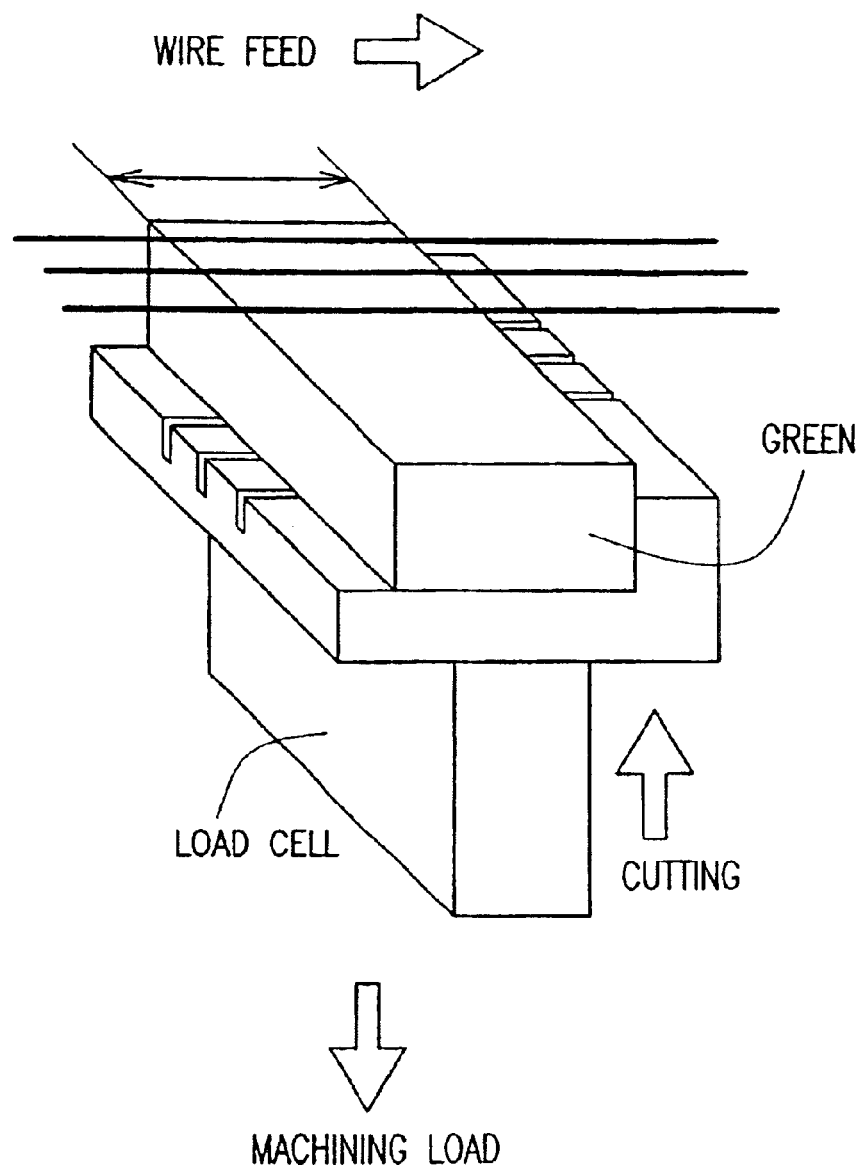
FIG. 3 is a perspective view diagrammatically illustrating a wire-saw used in an example of preferred embodiments of the present invention.

In this example, as shown in FIG. 3, a green compact moving upward from a lower position was cut with a wire-saw arranged in three lines in the atmosphere. The outer diameter of the wire (line diameter) of the wire-saw was approximately 0.24 mm and the wire pitch was approximately 5 mm. The green compact to be machined was produced with a known press from magnet powder (FSSS particle size: about 3.0 μm to about 3.2 μm) of an alloy including about 26% by mass of (Nd+Pr), about 5% by mass of Dy, about 1% by mass of B, about 1% by mass of Co, about 0.2% by mass of Al, about 0.1% by mass of Cu and the balance of Fe. The magnet powder was aligned in a magnetic field during the compaction. The applied magnetic field was about 1.2 T. The resultant green compact was in a roughly rectangular shape having approximate dimensions of 15 mm high×41.7 mm wide×66.2 mm depth.

The position of the green compact with respect to the wire-saw was determined so that the length of the contact portion of the green compact with each wire was about 41.7 mm. The machining load (load applied downward) received by the green compact from the wire-saw during the upward movement of the green compact was measured with a load cell. In the experiment, the wire feed speed was varied in the range of about 100 m/min to about 150 m/min. The cutting speed was varied in the range of about 150 m/min to about 420 mm/min.

Figure 4:
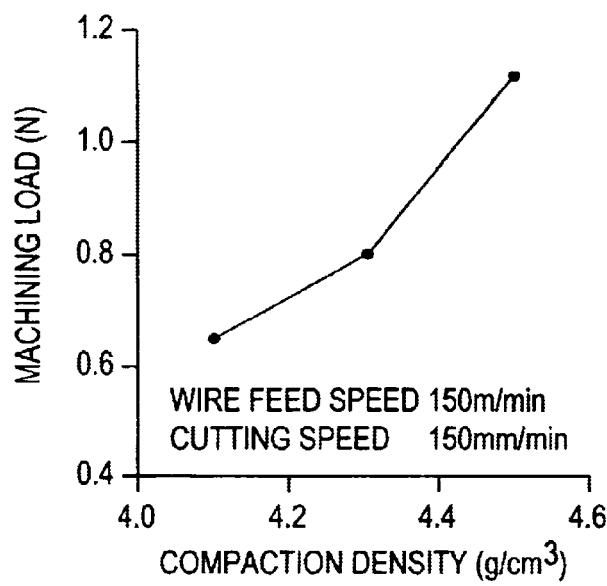
FIG. 4 is a graph showing the compaction density dependence of the machining load observed when a cutting fluid is added to powder for the sintered magnet.

FIG. 4 is a graph showing the compaction density dependence of the machining load. In the measurement shown in FIG. 4, the wire feed speed was about 150 m/min and the cutting speed was about 150 mm/min.

From FIG. 4, it is seen that the machining load increases with increase of the compaction density. Note however that if the compaction density is excessively low, the green compact decreases in strength and will easily cause cracking and chipping. To avoid this problem, the compaction density is preferably about 3.6 g/cm$^3$ or more at a minimum. From various standpoints, the compaction density is preferably in the range of about 3.8 g/cm$^3$ to about 5.0 g/cm$^3$. In consideration of the magnetic properties after sintering and the yield in relation to cracking and chipping of the green compact, the density of the green compact is more preferably in the range of about 4.0 g/cm³ to about 4.7 g/cm³. The true density of the magnet powder (alloy material) is about 7.5 g/cm³.

Figure 5:
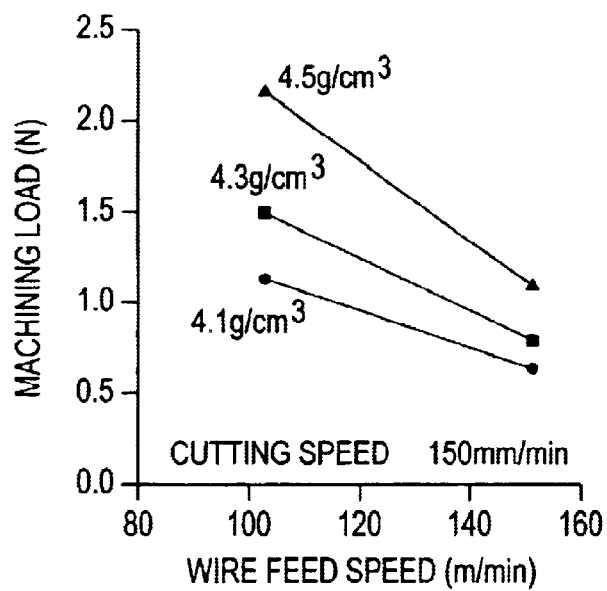
FIG. 5 is a graph showing the wire feed speed dependence of the machining load observed when a lubricant is added.

FIG. 5 is a graph showing the wire feed speed dependence of the machining load. In this measurement, the cutting speed was about 150 mm/min. FIG. 6 is a graph showing the cutting speed dependence of the machining load observed when the lubricant described above was added. In this measurement, the wire feed speed was about 150 m/min.

From FIG. 5, it is seen that the machining load decreases with increases in the wire feed speed. From FIG. 6, it is seen that the machining load decreases with decreases in the cutting speed. If the wire feed speed and the cutting speed are set at values in inappropriate levels, the machining load may become excessively large and, as a result, the cut surface of the green compact may be roughened. To state specifically, when the machining load is large, saw mark is formed on the cut surface making the surface uneven to a measurable level. This results in an increase of the number of process steps required for machining after sintering, and also causes an increase of the incidence of chipping at edges of the green compact after cutting.

FIG. 7A is a graph showing the relationship between the profile irregularity ("wave" or "surface roughness") of the cut surface after sintering and the compaction density. In this measurement, the wire feed speed was about 150 m/min and the cutting speed was about 150 mm/min. FIG. 7B is a perspective view illustrating the wave measuring range (about 32 mm) on the cut surface, and FIG. 7C is a graph showing measurement data (step data) of the wave. The graph of FIG. 7A was prepared based on the data of FIG. 7C.

As is seen in FIG. 7A, as the compaction density is higher (for example, about 4.3 g/cm³ or more), the profile irregularity of the sintered body improves.

Hereinafter, an example of cutting a green compact before sintering according to preferred embodiments of the present invention will be described together with a comparative example of cutting a sintered body, to examine the cutting speed and the wire feed speed capable of providing the most appropriate profile irregularity.

TABLE 1

|  | Cutting speed (mm/min) | Wire feed speed (m/min) |
| --- | --- | --- |
| Cutting of green compact | 150 | 150 |
| Cutting of sintered body | 0.67 | 800 |

As is apparent from Table 1, in the cutting of a soft green compact with the wire-saw according to preferred embodiments of the present invention, the cutting speed of more than approximately 200 times as high as that in the comparative example was achieved even under a comparative low wire feed speed. This improvement of the cutting speed, achieved by the reduced machining load, leads to reduction of the process time.

Table 2 below shows changes in size with sintering and grinding in the example according to preferred embodiments of the present invention.

TABLE 2

| Compaction density | Thickness of cut compact pieces (mm) | Thickness of sintered body (mm) | Thickness after grinding (mm) |
| --- | --- | --- | --- |
| 4.1 | 4.76 | 3.43 | 3.33 |
| 4.3 |  | 3.50 | 3.41 |
| 4.5 |  | 3.56 | 3.45 |

The thickness of cut pieces of the green compact immediately after the cutting with the wire-saw (size in the x-axis direction in FIG. 1) was about 4.76 mm, a value determined by subtracting the wire outer diameter (about 0.24 mm) from the wire pitch (about 5 mm).

By sintering the compact pieces, the thickness decreased by nearly 30%, and further by grinding the sintered body, the thickness decreased by about 0.1 mm. The shrinkage of the green compact by sintering was most significant in the direction of the aligning magnetic field applied during the compaction. In this example, the magnetic field had been applied in the thickness direction of the green compact to align the powder.

In the conventional cutting, a sintered body already subjected to shrinkage by sintering was cut. Therefore, the ratio of the cutting clearance to the thickness of the sintered body was large. On the contrary, in the cutting according to preferred embodiments of the present invention, in which a green compact before shrinkage is cut, the ratio of the cutting clearance to the thickness of the green compact is comparatively small when the wire has the same outer diameter. This can minimize the amount of the material wasted by the cutting and thus contributes to improvement of the yield (use efficiency) of the material.

Hereinafter, referring to FIG. 8, preferred ways of sintering of a green compact sliced with a wire-saw (ways of arrangement of sliced compact pieces during sintering) will be described.

Figure 8:
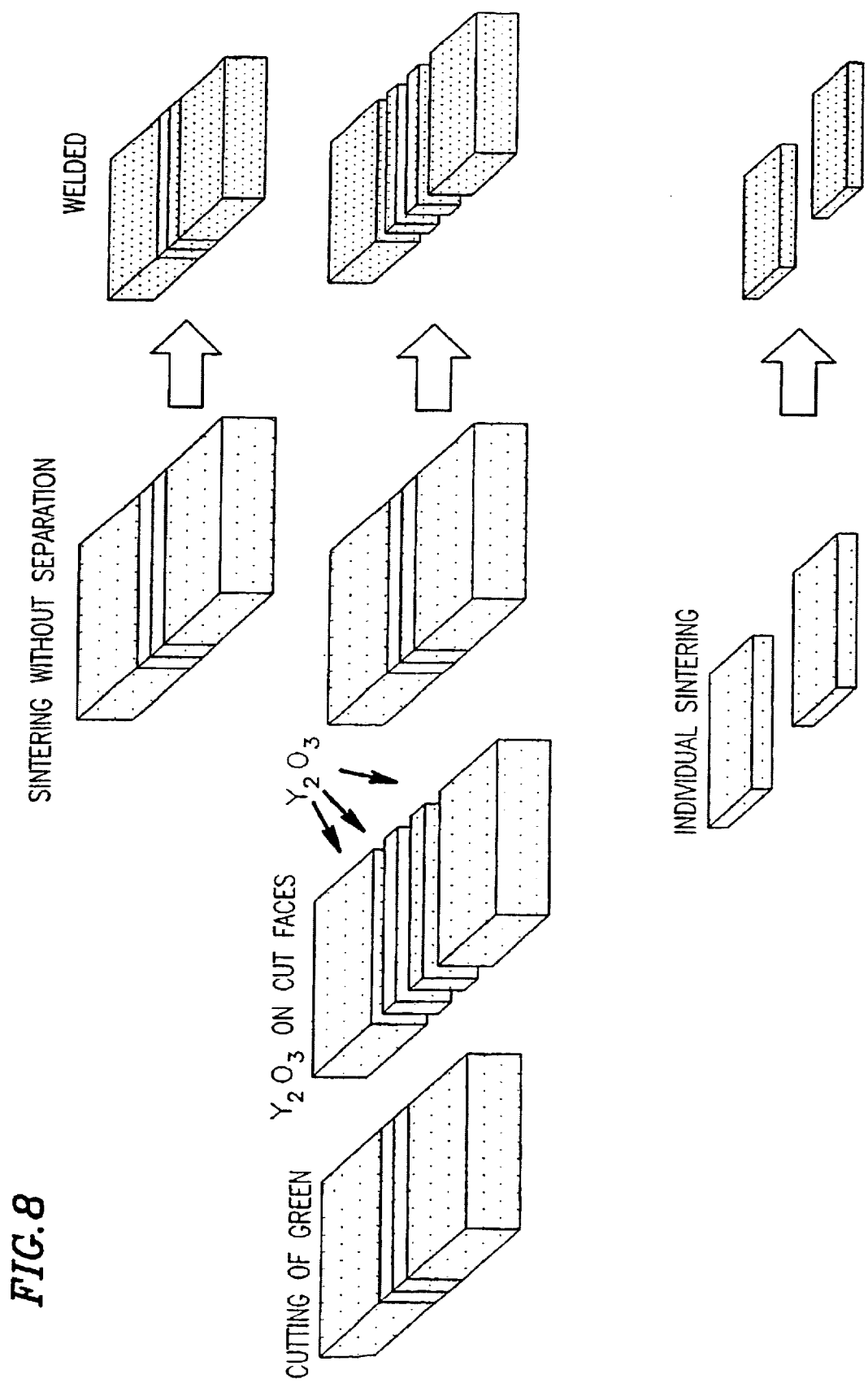
FIG. 8 illustrates preferred ways of sintering of a green compact sliced with a wire-saw according to preferred embodiments of the present invention.

As shown in FIG. 8, if the compact pieces which are cut apart with the wire-saw are sintered with cut surfaces closely facing each other, the cut surfaces tend to be fused (or welded) to each other. This trouble of fusing more easily occurs when the cutting clearance is small. To avoid fusing by sintering, it is preferable to provide anti-fusing powder such as $Y_2O_3$ powder in the gap between the cut surfaces. Such anti-fusing powder is not limited to $Y_2O_3$ powder but may be made of any material resistant to reaction with the rare-earth element of the magnet. For example, powder or flakes of $Al_2O_3$ and C may be used, or other suitable material may also be used.

Alternatively, after the cutting with the wire-saw, the compact pieces may be placed with a widened space therebetween, or may be sintered separately, as shown in the lower portion of FIG. 8. In these cases, the space between the adjacent compact pieces is preferably about 0.1 mm or more.

Figure 9:
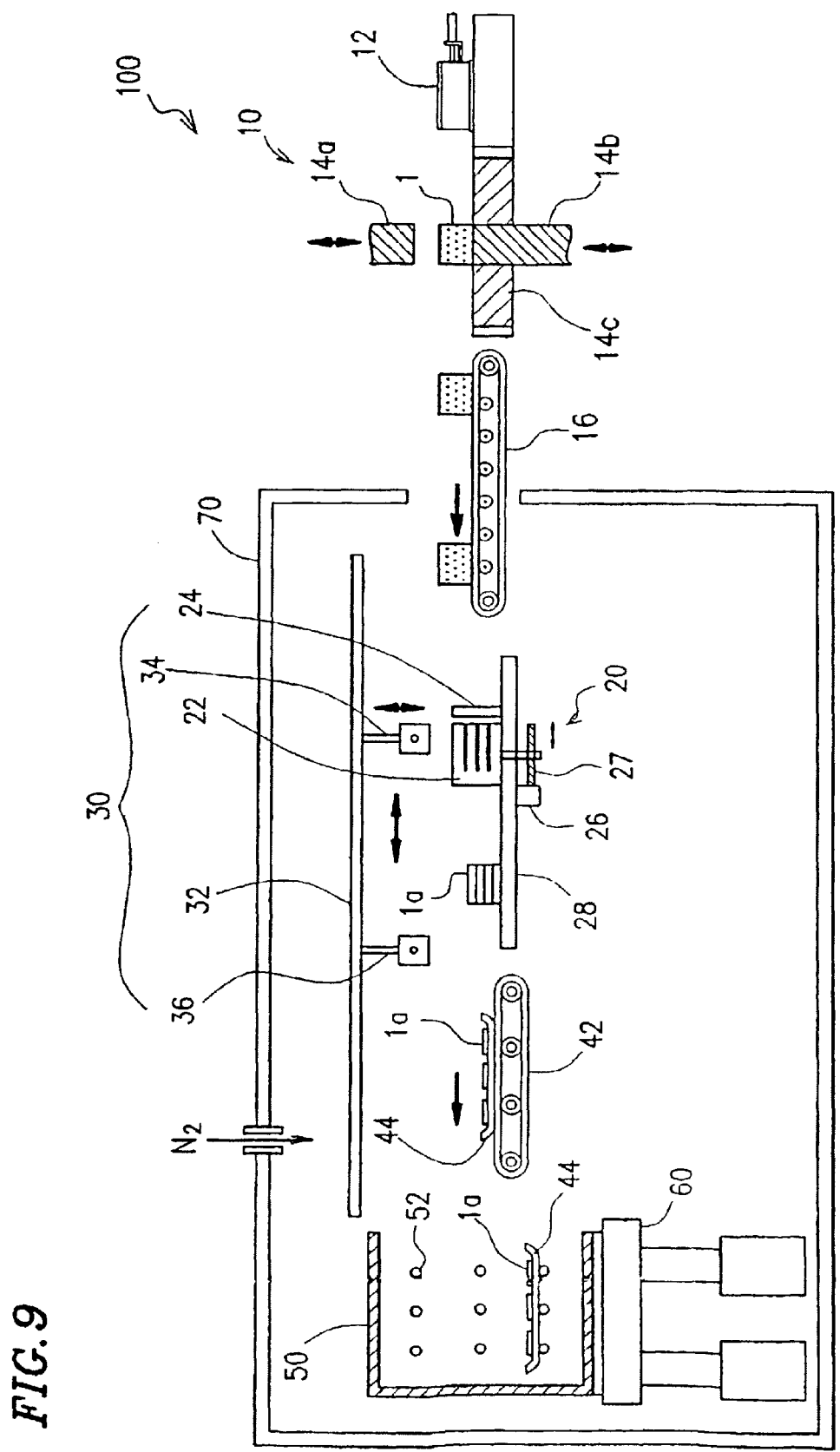
FIG. 9 is a diagrammatic illustration of compact machining system including a wire-saw machine suitably used for preferred embodiments of the present invention.

FIG. 9 illustrates an exemplary construction of a magnet powder compact production system 100 including a wire-saw machine 20 according to Preferred Embodiment 2 of the present invention.

The magnet powder compact production system 100 includes a compaction machine 10 and the wire-saw machine 20. The magnet powder compact production system 100 further includes a belt conveyor 16 for transporting green compacts 1 from the compaction machine 10 to the wire-saw machine 20, a belt conveyer 42 for transporting sliced compact pieces 1a from the wire-saw machine 20 to a sintering case 50, and a transfer machine 30 for transferring the green compacts 1 from the belt conveyor 16 to the wire-saw machine 20 and transferring the compact pieces 1a from the wire-saw machine 20 to the belt conveyer 42.

The magnet powder compact production system 100 is enclosed with a protection wall 70 to enable substitution of nitrogen gas for the air, for example, to decrease the oxygen concentration at least in the surroundings of the wire-saw machine 20. In the illustrated example, the area of the system from a midway of the belt conveyer 16 to the sintering case 50 is enclosed with the protection wall 70, and nitrogen gas is fed into the area enclosed with the protection wall 70 to enable control of the oxygen concentration to within the range described above.

Hereinafter, the operation of the magnet powder compact production system 100 will be described.

The compaction machine 10 includes an upper punch 14a, a lower punch 14b and a die 14c, together with a mechanism for operating these components and a control mechanism (both not shown). Magnet powder is dropped into a cavity defined by a through hole of the die 14c and the upper surface of the lower punch 14b using a feeder box 12, so that the cavity is filled with the magnet powder. The powder is uniaxially pressed with the upper and lower punches 14a and 14b, to produce the green compact 1. The compaction machine 10 may have a magnetic circuit (not shown) to enable application of an aligning magnetic field to the magnet powder during the compaction. The direction of the aligning magnetic field may be substantially parallel with or substantially perpendicular to the pressing direction. The compaction machine 10 may also be provided with a magnetic circuit (not shown) for generating a demagnetizing magnetic field.

The green compact 1 produced by the compaction machine 10 is transported with the belt conveyor 16 to the area enclosed with the protection wall 70 in which the wire-saw machine 20 is mounted. The belt conveyor 16 may be provided with a magnetic circuit (not shown) for generating a demagnetizing magnetic field or a mechanism for spraying inert gas such as nitrogen gas to the green compact 1, for removal of magnet powder attaching to the green compact 1.

Inside the area enclosed with the protection wall 70, the green compact 1 is transferred to the wire-saw machine 20, which is mounted on a platform 28, with an arm 34 of the transfer machine 30 and placed in position. The transfer machine 30 has two arms 34 and 36 on a rail 32. The arms 34 and 36 hold/release the green compact 1 or the sliced compact pieces 1a with a magnetic chuck (magnetic attraction holding mechanism), for example. The arms 34 and 36 are individually movable vertically and also move along the rail 32. The operations of the arms 34 and 36 are controlled by a sequencer, for example, individually or in combination. The arms 34 and 36 may otherwise clutch the green compact 1 with an air cylinder, for example.

The green compact 1 is sliced horizontally by the wire-saw machine 20 into a plurality of compact pieces 1a as will be described later in detail. A compact holding device 22 is relatively moved with respect to a wire-saw unit 24 to cut the green compact 1 with wire-saws 24b of the wire-saw unit 24. The relative speed (cutting speed) of the green compact 1 with respect to the wire-saws 24b can be adjusted by changing the rotational speed of a motor 26. The resultant plurality of compact pieces 1a are attracted to and held by the arm 34, and moved to a retreat position on the platform 28.

The compact pieces 1a at the retreat position on the platform 28 are attracted to and held by the arm 36 one by one by the top surface of each compact piece, and are transferred to a tray 44 placed on the belt conveyor 42 one by one separately. In this preferred embodiment, the green compact 1 is sliced (cut) to have horizontal cut surfaces. Therefore, by attracting the top surface (or cut surface) of each compact piece 1a to the arm 36 and moving the arm 36 substantially perpendicularly (in the gravitational direction), only a force vertical to the cut surface acts and substantially no shear force is generated against the cut surface. This prevents chipping of the compact piece 1a.

After a predetermined number of compact pieces 1a are placed on the tray 44, the tray 44 is transported into the sintering case 50 with the belt conveyor 42. The sintering case 50 has a plurality of racks each made of a plurality of support bars. The height of the racks is adjusted by vertical movement of a lift 60 to enable receipt of the tray 44 from the belt conveyor 42.

After placement of a predetermined number of trays 44 in the sintering case 50, the sintering case 50 is transported to a sintering furnace. Subsequently, process steps similar to those described in Preferred Embodiment 1 are performed to complete the manufacture of the sintered magnets.

The construction and operation of the wire-saw machine 20 in Preferred Embodiment 2 will be described in detail with reference to FIGS. 10 and 11.

The wire-saw machine 20 includes the compact holding device 22 and the wire-saw unit 24.

Figure 11:
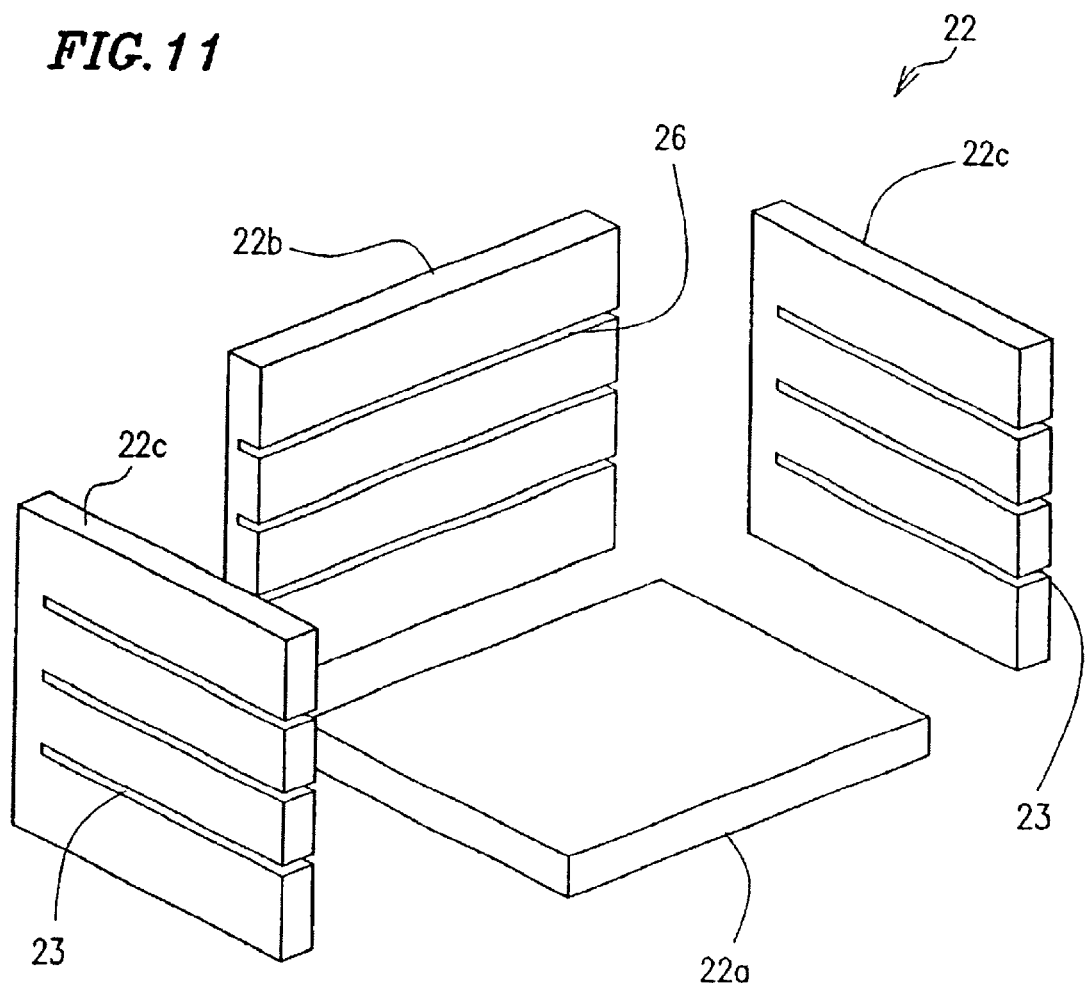
FIG. 11 is a diagrammatic exploded perspective view of a compact holding device of the wire-saw machine.

As shown in FIG. 11, the compact holding device 22 has a bottom plate 22a, a back plate 22b and two side plates 22c. The back plate 22b has grooves 26 for accommodating the wire-saws after cutting of the green compact 1. Each groove 26 has a size (width and depth) that is large enough to completely accommodate the wire-saw. Without the grooves 26, the wire-saws that have reached the back plate 22b may be displaced vertically and/or a gap may be formed between the back plate 22b and the compact pieces 1a, resulting in occurrence of chipping in the cut end portion of the green compact 1. The two side plates 22c have slits 23 for passing of the wire-saws, and sandwich the green compact 1 and the sliced compact pieces 1a therebetween throughout the cutting process.

The green compact 1 is placed on the bottom plate 22a of the compact holding device 22, sandwiched by the two side plates 22c, and is relatively moved with respect to the wire-saw unit 24 while being supported by the back plate 22b. The back plate 22b and the side plates 22c hold the green compact 1 with an air cylinder (not shown), for example, and release the compact pieces 1a after the cutting.

Figure 10:
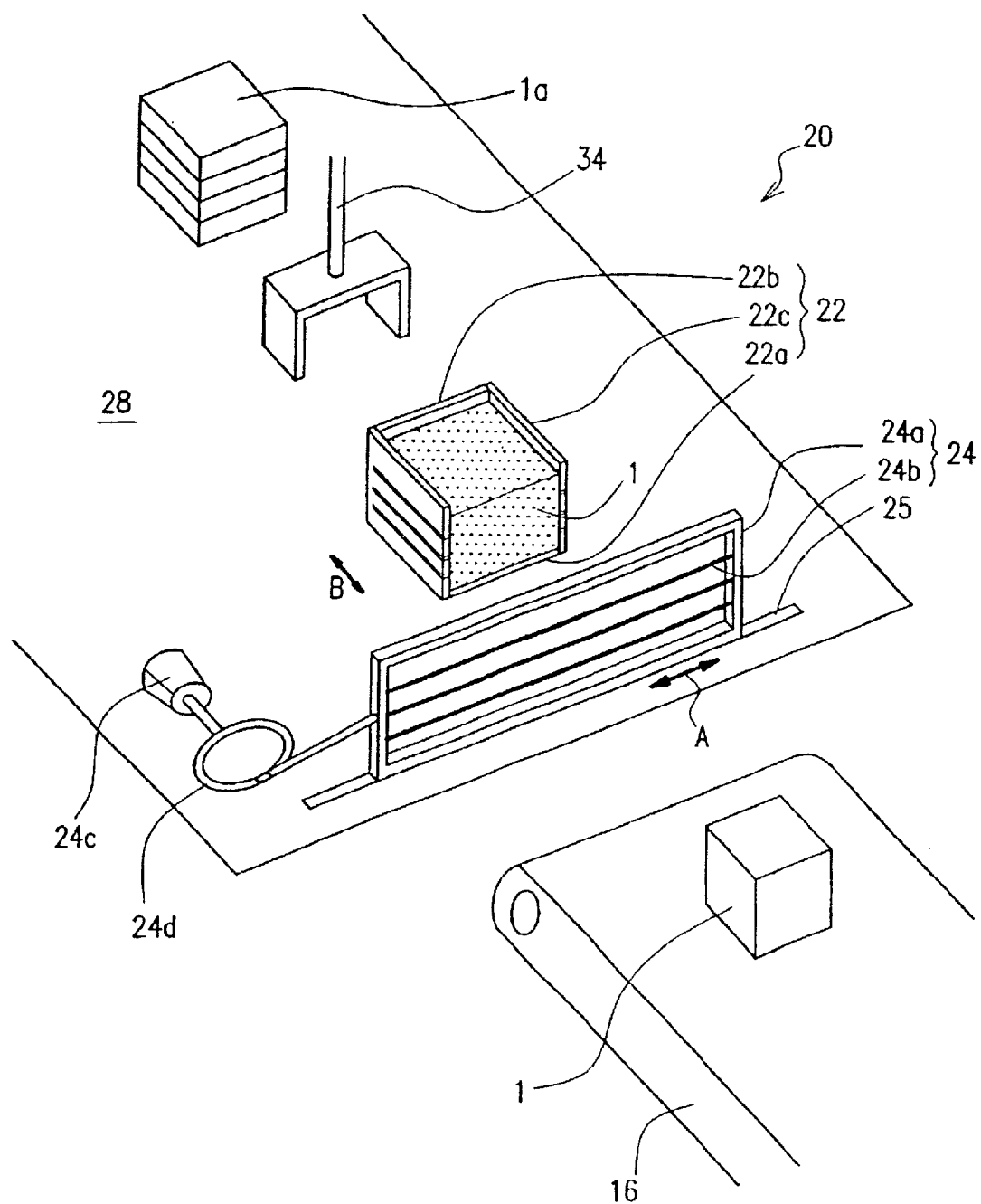
FIG. 10 is a diagrammatic illustration of another wire-saw machine suitable for use in preferred embodiments of the present invention.

The wire-saw unit 24 has a frame 24a over which three fixed grain wire-saws 24b are stretched as shown in FIG. 10. The frame 24a is slidably attached to a rail 25 mounted on the station 28. The frame 24a is connected to a crank 24d coupled to a motor 24c and reciprocates along the rail 25 with the rotation of the motor 24c in the directions shown by arrow A in FIG. 10.

The green compact 1 held by the compact holding device 22 is relatively moved with respect to the reciprocating wire-saws 24b in the directions shown by arrow B in FIG. 10. Specifically, the wire-saws 24b pass along the slits 23 of the side plates 22c of the compact holding device 22 and finally reach the grooves 26 of the back plate 22b, at which the green compact 1 is cut into a plurality of compact pieces 1a. The compact holding device 22, which still holds the compact pieces 1a, is then moved in the opposite direction (retreated) (see arrow B in FIG. 10) while the wire-saws 24b are being reciprocated. By this re-passing of the wire-saws 24b along the cut surfaces (gaps between the plurality of compact pieces 1a), saw dust remaining on the cut surfaces is reliably removed.

Since the diameter of the wire-saws 24b is comparatively small and thus, the discharge efficiency of saw dust is low, a large amount of saw dust remains between the compact pieces 1a. This may cause close contact between the adjacent compact pieces 1a, and make it difficult to separate the compact pieces 1a from one another. In particular, magnet powder of the green compact formed with application of an aligning magnetic field has residual magnetization, and this decreases the discharge efficiency. If the compact pieces 1a are separated from one another in this state, chipping may occur in the compact pieces 1a. By the re-passing of the wire-saws 24b along the cut surfaces, saw dust remaining in gaps between the compact pieces 1a is removed, and thus, separation of the compact pieces 1a from one another is possible without occurrence of chipping. That is, as described above, the compact pieces 1a can be separated from one another one by one by just holding the top surface of each compact piece 1a by attraction with the magnetic chuck and lifting the compact piece upward.

The speed of the second passing of the wire-saws 24b for removal of saw dust may be higher than the passing speed (cutting speed) of the wire-saws 24b during the cutting. The second passing of the wire-saws 24b is preferably performed at a speed that is substantially equal to or higher than the passing speed during the cutting because if the speed of the second passing is too low, a sufficient saw dust discharge effect may not be obtained. The direction of the second passing of the wire-saws 24b is not necessarily opposite to the direction during the cutting, but the opposite direction is preferred because the second passing in the opposite direction can also serve as the process of restoring the compact holding device 22 to the original position for receipt of the next green compact 1.

In the illustrated example, the green compact 1 and the wire-saws 24b were moved relative to each other in the horizontal plane for cutting. The effect obtained by re-passing the wire-saws 24b along the cut surfaces described above can also be obtained by an application in which the green compact 1 and the wire-saws 24b are moved relative to each other in the substantially perpendicular plane as in Preferred Embodiment 1, for example.

The number of wire-saws 24b stretched over the frame 24a is not limited. The tension of the wire-saws 24b (for example, about 0.05 N to about 10 N) can be appropriately set depending on the hardness (easiness of machining), the cutting speed and other factors. The speed of movement of the compact holding device 22 (cutting speed) can be appropriately set depending on the thickness of the wire-saws 24b, the feed speed (travel speed), the tension, the hardness of the green compact 1 and other features. By the appropriate adjustment, the cut surfaces can be made smooth and the number of process steps such as grinding can be reduced.

In the illustrated example, the wire-saws 24b were reciprocated with the motor 24c and the crank 24d. Alternatively, the wire-saws 24b may be made to travel by any of various known means. For example, a long wire may be made to travel in the opposite directions or in one direction as in a large-scale wire-saw machine. Otherwise, an endless wire-saw may be used. Since the green compact 1 is easily cut with reduced wear of the wire-saw, feed of a new wire is not necessarily required. This enables use of various drive methods.

Saw dust generated during the cutting is prevented from flying to the mechanical parts (including the motor 24c, the crank 24d, the motor 26 and a ball screw 27) by the relative movement of the compact pieces 1a and the wire-saws 24b in the horizontal plane and the reciprocating movement of the wire-saws 24b in the horizontal plane as described above. This is advantageous in that the maintenance of the machine is easy. If magnet powder having residual magnetization flies to the mechanical parts, such powder is difficult to be removed and may cause breakage of the mechanical parts. The cutting of the green compact 1 in the horizontal plane is also advantageous in that the compact pieces 1a can be separated from one another without generation of shear force as described above.

The green compact 1 formed by the compaction machine 10 is placed in the compact holding device 20 mounted in position by the transfer machine 30. If the aim 34 is provided with a rotating mechanism, it is possible to cut the green compact 1 in a direction that is substantially parallel to an arbitrary surface of the green compact 1. In other words, the cut surface can be arbitrarily determined with respect to the direction of the aligning magnetic field in the green compact 1. For example, when the green compact 1 produced by substantially parallel pressing is placed in the compact holding device 22 as it is, the green compact 1 will be cut in the plane that is substantially perpendicular to residual magnetization. However, by providing the arm 34 with a mechanism capable of rotating by 90° C. in the perpendicular plane, the green compact 1 can be cut in the plane that is substantially parallel to residual magnetization. Otherwise, the green compact 1 produced by substantially perpendicular pressing may be cut in the plane that is substantially perpendicular to residual magnetization.

Figure 12:
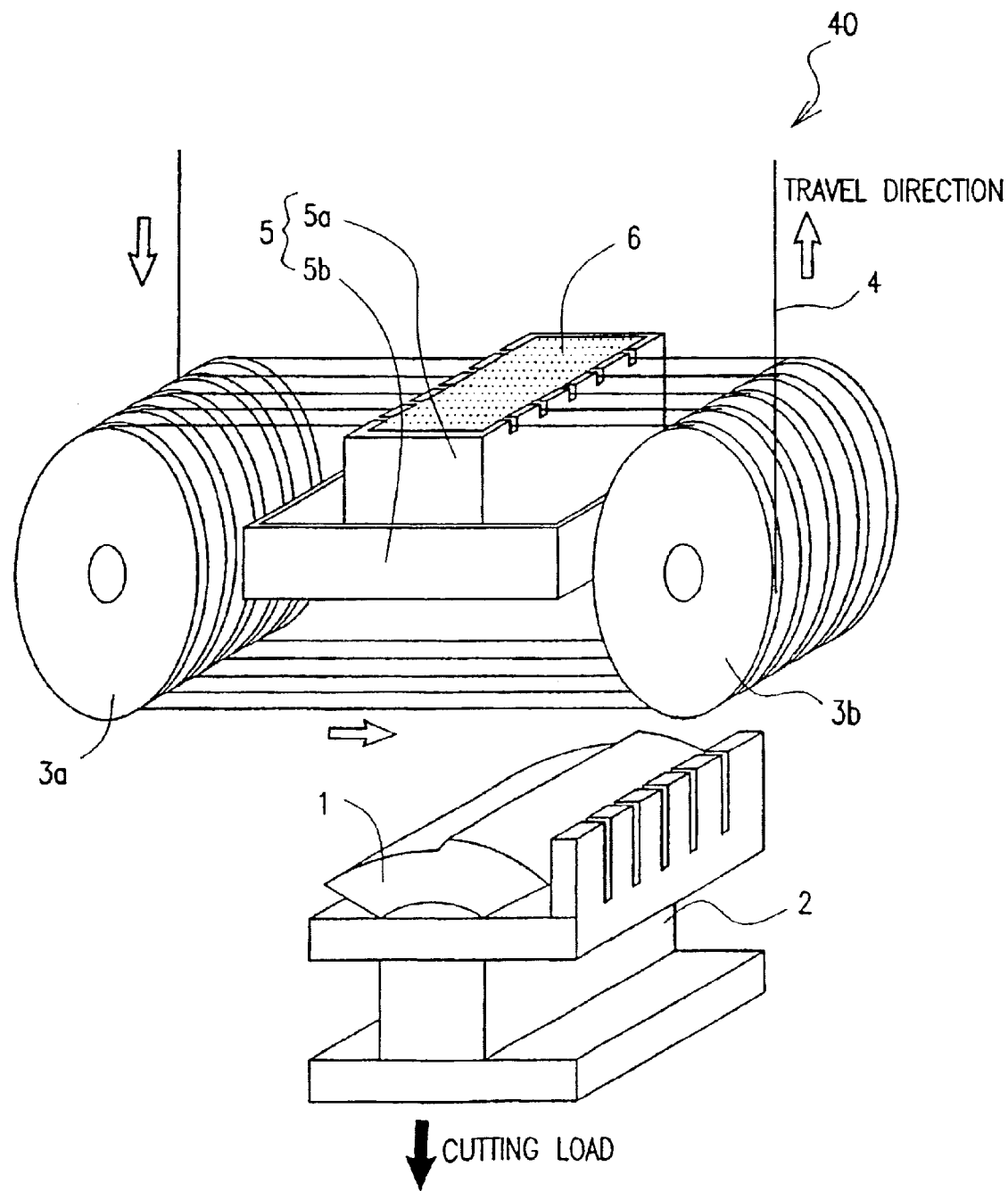
FIG. 12 is a diagrammatic illustration of a wire-saw machine 40 suitably used in Preferred Embodiment 3 of the present invention.

FIG. 12 illustrates an exemplary construction of a wire-saw machine 40 suitably used for a method for manufacturing a sintered magnet according to Preferred Embodiment 3 of the present invention.

The wire-saw machine 40 shown in FIG. 12 is different from the wire-saw machine shown in FIG. 1 in that a lubricant applying device 5 is provided. Components having substantially the same functions as those of the wire-saw machine shown in FIG. 1 are denoted by the same reference numerals, and repetitive description thereof is omitted.

In the wire-saw machine 40, a cutting fluid 6 is applied to a wire-saw 4 by the lubricant applying device 5 before the wire-saw 4 comes into contact with a green compact 1 for cutting. The lubricant applying device 5 preferably includes a container 5a for retaining the cutting fluid 6 and a pan 5b for collecting the cutting fluid overflowing from the container 5a. The cutting fluid 6 is kept in the state of overflowing from the top opening of the container 5a, to be applied to portions of the wire-saw 4 traveling through slits formed in the side surfaces of the container 5a.

In this preferred embodiment, as the cutting fluid, a saturated hydrocarbon base solvent (typically, isoparaffin and normal paraffin) that is not apt to remain in the sintered magnet as carbon, is preferably used. The average molecular weight of the saturated hydrocarbon base solvent is preferably in the range of about 120 to about 500. A solvent having an average molecular weight less than about 120 is weak in cohesion and thus, experiences difficulty in binding saw dust together efficiently. If a solvent having an average molecular weight exceeding about 500 is used, the amount of carbon remaining in the sintered body will be large and this disadvantageously decreases the magnetic properties of the sintered body. The average molecular weight is more preferably in the range of about 140 to about 450.

The boiling point can also be used for specifying a preferred material for the saturated hydrocarbon base solvent. A saturated hydrocarbon base solvent having a boiling point in the range of about 80° C. to about 250° C. is preferable. A solvent having a boiling point less than about 80° C. is weak in cohesion and thus experiences difficulty in binding saw dust together efficiently. If a solvent having a boiling point exceeding about 250° C. is used, the amount of carbon remaining in the sintered body will be large and this disadvantageously decreases the magnetic properties of the sintered body. A solvent having a boiling point less than about 80° C. is high in volatility, and thus, such a solvent is disadvantageous from the standpoint that the work environment may be easily polluted, in addition to the reason described above. As the saturated hydrocarbon base solvent, one having an average molecular weight in the range of about 140 to about 450 or a boiling point in the range of about 100° C. to about 230° C. is more preferable. Only a comparatively small amount of such a solvent can exhibit the effect of binding saw dust efficiently and discharging the saw dust. In particular, isoparaffin is preferred because it can be easily removed and thus, the amount of carbon remaining in the sintered body can be made small. Isoparaffin (flash point: 49° C., viscosity: 1.2 $mm^2$/sec, molecular weight: 140 to 150, boiling point: 166° C. (initial boiling point)) was used in examples of this preferred embodiment to be described later. To effectively prevent fusing between the cut compact pieces, a dispersion with anti-fusing powder dispersed in the cutting fluid may be used. In this preferred embodiment, $Y_2O_3$ powder (yttria powder) is preferably used as the anti-fusing powder. The anti-fusing powder is not limited to $Y_2O_3$ powder, but powder and flakes of $Al_2O_3$, C and other suitable material may also be used. The amount of the anti-fusing powder dispersed in the cutting fluid may be appropriately determined. For example, it is preferably in the range of about 10 g/L to about 500 g/L To disperse anti-fusing powder in the cutting fluid and apply the resultant dispersion to the wire-saw 4, the dispersion is preferably agitated to avoid retention of the anti-fusing powder in the container 5a shown in FIG. 12. The anti-fusing powder applied to the surface of the wire-saw 4 together with the cutting fluid attaches to the cut surfaces formed during the cutting, and effectively prevents fusing between the cut compact pieces during the subsequent sintering process.

The effect of improving the discharge efficiency by use of the cutting fluid will be described in examples using the wire-saw machine 40 shown in FIG. 12. Only isoparaffin was used as the cutting fluid in one example, and yttria was dispersed in isoparaffin (yttria concentration: 200 g/L) in another example. These examples were compared with a case of normal cutting with no cutting fluid used.

As the green compact 1, an arch-shaped green compact including top and bottom surfaces that have different curvatures as shown in FIG. 12. The magnet powder used for formation of the green compact 1 is the same as that used in the example in Preferred Embodiment 1. The compaction density is about 4.2 g/$cm^3$.

The green compact 1 described above was cut so as to form cut surfaces in the plane including the substantially perpendicular direction when the green compact 1 was placed on a support base of a drive device 2 (vertical cutting). The cutting was preferably performed using an electrodeposited grain wire-saw (outer diameter: about 0.257 mm, particle size of abrasive grains: about 40 µm to about 60 µm) as the wire-saw 4 under the conditions of a wire feed speed of about 230 rn/sec and a cutting speed of about 150 mm/min.

Thereafter, the cut compact pieces were sintered directly with no special process of separating the compact pieces from one another. The incidence of fusing between the resultant sintered bodies (cut compact pieces) and the incidence of cracking thereof were evaluated. The evaluation results are shown in Table 3 below. The number of samples is about 150 for each example.

Note that the sintering process is performed at a temperature of about 1000° C. to about 1100° C. in an inert gas atmosphere (rare gas and nitrogen gas) or under vacuum for about 1 hour to about 5 hours. The resultant sintered bodies may be subjected to aging at about 450° C. to about 800° C., for example, for about 1 hour to about 8 hours, as required. To reduce the amount of carbon contained in the sintered bodies to improve the magnetic properties, the lubricant added to the alloy powder and the cutting fluid used in the cutting process may be removed by heating before the sintering process, as required. The heating for lubricant removal is performed at a temperature of about 100° C. to about 600° C. in a decompressed atmosphere for about 3 to about 6 hours although these conditions depend on the types of the lubricant and the cutting fluid. In this preferred embodiment, the heating was performed at about 500° C. for approximately two hours.

TABLE 3

| Cutting fluid | | Normal cutting | Isoparaffin only | Isoparaffin + Yttria |
| --- | --- | --- | --- | --- |
| Wire | Isoparaffin | None | Applied | Applied |
| state | Yttria | None | None | Applied |
| Cutting load (gf) | | 8.3 | 28.8 | 31.5 |
| Fusing rate (%) | | 44.4 | 2.5 | 1.3 |
| Cracking rate (%) | | 2.5 | 0.8 | 10.0 |

As is apparent from Table 3, the fusing rate greatly decreases by the cutting using the wire-saw 4 with the cutting fluid applied thereto compared with the normal cutting with no cutting fluid used. This indicates that the production yield is improved by application of a cutting fluid. As for the cracking rate, no large difference is observed, probably because the strength of the green compact does not decrease by application of a cutting fluid.

As is found from Table 3, the cutting load increases by the cutting with the cutting fluid compared with the normal cutting. This is probably because saw dust particles cling together on the surface of the wire-saw 4 with the cutting fluid applied thereto and are carried away from the cut portions by the wire-saw 4 as the wire-saw 4 travels.

Although the cutting load increases with the use of the cutting fluid, the load of about 0.30 gf is still very small. Therefore, it is possible to cut with high yield even an odd-shaped green compact as shown in FIG. 12, which is small in area at the portion that contacts the support base and tends to easily generate deformation, chipping and other defects due to the cutting load. Thus, since a green compact having a shape close to the shape intended for a final sintered magnet can be cut with high yield, the subsequent shaping process can be omitted, or the time required for this process can be shortened.

Figure 13:
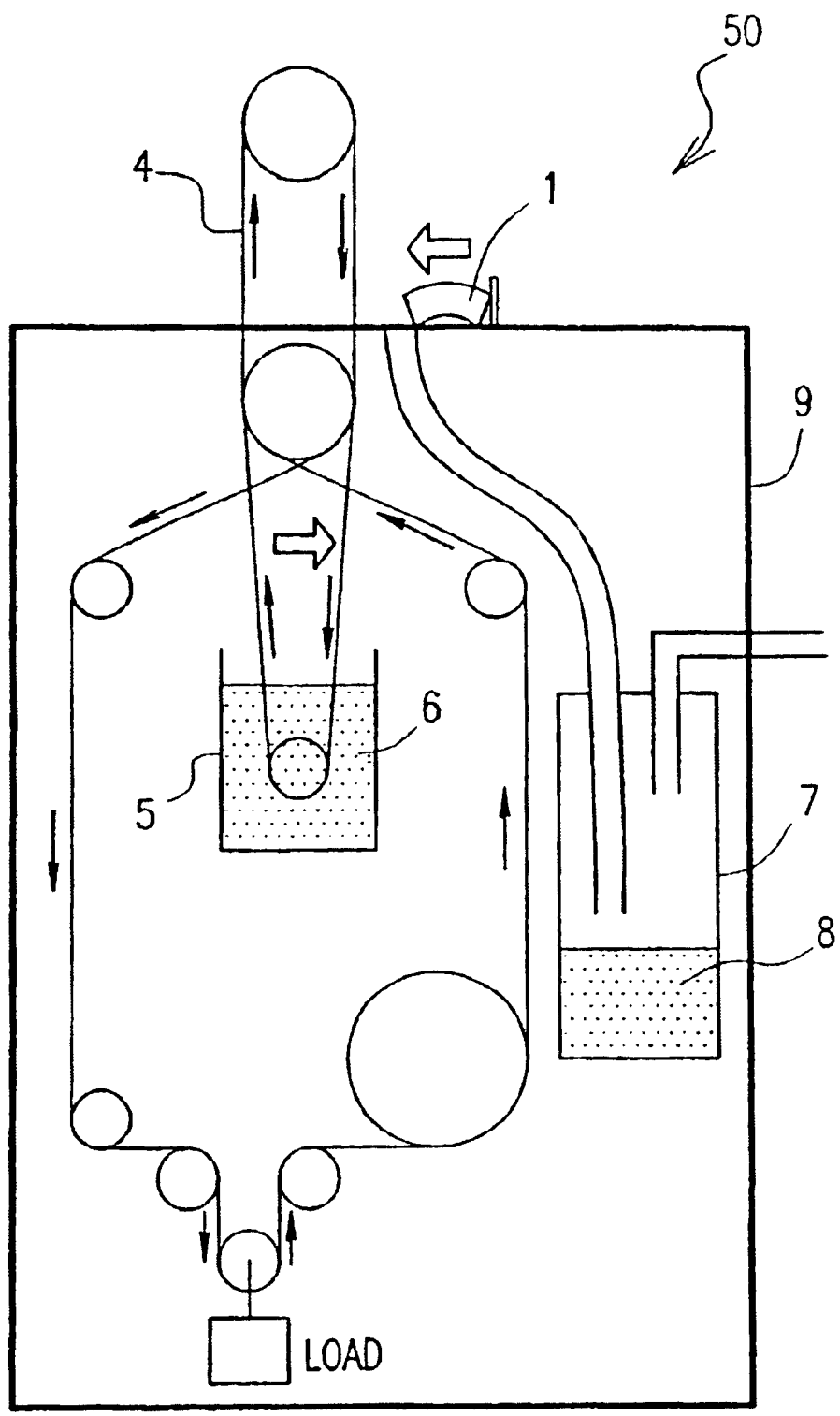
FIG. 13 is a diagrammatic illustration of a wire-saw machine 50 suitably used in Preferred Embodiment 3 of the present invention.

A wire-saw machine 50 shown in FIG. 13 may also be used for decreasing the load (friction resistance) applied to a green compact during the cutting.

In the wire-saw machine 50, a green compact 1 is relatively moved roughly in the horizontal direction (shown by hollow arrows in FIG. 13) with respect to a wire-saw 4 traveling roughly in the perpendicular direction, so that the green compact 1 is cut forming cut surfaces in the plane including the substantially perpendicular direction. In this case, the area of the green compact 1 that contacts the traveling wire-saw 4 (length of the cut portion) is smaller than that in the case of using the wire-saw machine 40 shown in FIG. 12. Therefore, the load applied to the green compact 1 is smaller and thus, the cut surfaces are much smoother.

The direction of the travel of the wire-saw 4 and the direction of the relative movement of the green compact 1 are not limited to those shown in FIGS. 12 and 13, but may be appropriately determined depending on the shape of the green compact 1 and other suitable factors. As described above, cutting in a direction in which the length of the cut portion can be shortened is preferred because smooth cut surfaces are obtained.

The wire-saw machine 50 includes a wire-saw drive section and a wet dust collector 7 inside a case 9. By providing the wire-saw drive section under the position for cutting as in the illustrated example, it is possible to secure enough room for the cutting process and a process relevant to the cutting process (for example, transport of the green compact 1). Saw dust is collected in a collecting liquid 8 in the wet dust collector as shown in FIG. 13. By this dust collection, pollution of the work environment is prevented. Nitrogen gas is preferably substituted for the atmosphere in the case 9.

In Preferred Embodiment 3, the cutting fluid was applied to the wire-saw 4 by immersion. Alternatively, dropping, spraying, or a combination thereof may be used. Otherwise, a green compact may be retained in a cutting fluid and cut in the immersed state. This method however has a problem in disposal of the cutting fluid and other material. Therefore, to obtain a sufficient effect with a small amount of cutting fluid, use of any of the immersion, dropping and spraying methods is preferred. The application of a cutting fluid to the wire-saw by immersion, dropping or spraying can be implemented by a structure or a device comparatively easily. Therefore, this is applicable to the wire-saw machine 20 (FIG. 10) in Preferred Embodiment 2, for example.

The R—Fe—B rare earth magnet powder preferably used in the above-mentioned preferred embodiments may be prepared in the following process steps.

First, cast flakes of an R—Fe—B rare earth magnet alloy are prepared by a known strip-casting technique. Specifically, an alloy having a desired composition is melted by a high-frequency melting process, thereby obtaining a melt of the alloy. The molten alloy is kept at about 1350° C. and then rapidly quenched by a single roller process to obtain a flake-like cast ingot of the alloy with a thickness of about 0.3 mm. The rapid quenching process is performed under the conditions that the peripheral surface velocity of the roller is about 1 m/sec., the cooling rate is about 500° C./sec. and sub-cooling temperature is 200° C.

The thickness of the rapidly solidified alloy prepared this way is in the range from about 0.03 mm to about 10 mm. The alloy includes $R_2T_{14}B$ crystal grains and R-rich phases dispersed around the grain boundaries of the $R_2T_{14}B$ crystal grains. The sizes of the $R_2T_{14}B$ crystal grains are about 0.1 µm to about 100 µm and about 5 µm to about 500 µm in the minor and major axis directions, respectively. The thickness of the R-rich phases is preferably about 10 µm or less. A method of making a material alloy by the strip-casting technique is disclosed in U.S. Pat. No. 5,383,978, for example. The contents of U.S. Pat. No. 5,383,978 are incorporated herein by reference.

Next, the flake-like cast alloy ingot is filled into material packs, which are subsequently loaded into a rack. Thereafter, the rack loaded with the material packs is transported to the front of a hydrogen furnace using a material transporter and then introduced into the hydrogen furnace. The material alloy is heated and subjected to the hydrogen pulverization process inside the furnace. The material alloy, roughly pulverized this way, is preferably unloaded after the temperature of the alloy has decreased approximately to room temperature. However, even if the material alloy is unloaded while the temperature of the alloy is still high (e.g., in the range from about 40° C. to about 80° C.), the alloy is not oxidized so seriously unless the alloy is exposed to the air. As a result of this hydrogen pulverization process, the rare earth alloy is roughly pulverized into a size of about 0.1 mm to about 1.0 mm. As described above, before subjected to this hydrogen pulverization process, the material alloy has preferably been pulverized more roughly into flakes with a mean particle size between about 1 mm and about 10 mm.

After the material alloy has been pulverized roughly through this hydrogen pulverization process, the brittled alloy is preferably crushed more finely and cooled down using a cooling machine such as a rotary cooler. If the unloaded material still has a relatively high temperature, then the material may be cooled for an increased length of time.

Thereafter, the material powder, which has been cooled down approximately to room temperature by the rotary cooler, is further pulverized even more finely to make a fine powder. In the illustrated preferred embodiment, the material powder is finely pulverized using a jet mill within a nitrogen gas environment, thereby obtaining a magnet powder with an average diameter (FSSS particle size) of about 3.0 µm to about 3.2 µm. The concentration of oxygen in this nitrogen gas environment should preferably be as low as about 10,000 ppm. A jet mill for use in such a process is disclosed in Japanese Patent Publication for Opposition No. 6-6728, for example. More specifically, the weight of oxygen contained in the finely pulverized magnet powder should preferably be about 6,000 ppm or less, more preferably about 3000 ppm or less, by controlling the concentration of an oxidizing gas (i.e., oxygen or water vapor) contained in the ambient gas used for the fine pulverization process. This is because if the weight of oxygen contained in the rare earth magnet powder exceeds about 6,000 ppm, then the total percentage of non-magnetic oxides in the resultant sintered magnet will generally be too high to realize superior magnetic properties.

Subsequently, a lubricant (e.g., at about 0.3 mass %) is added to and mixed with this magnet powder in a rocking mixer, thereby coating the surface of the magnet powder particles with the lubricant. As the lubricant, an aliphatic ester diluted with a petroleum solvent may be used. In the illustrated example, methyl caproate is used as the aliphatic ester and isoparaffin is used as the petroleum solvent. Methyl caproate and isoparaffin may be mixed at a weight ratio of approximately 1:9, for example. A cutting fluid like this will not merely prevent the oxidation of the powder particles by coating the surface thereof, but will also eliminate disordered orientations from the green compact by making uniform the density of the compact during the pressing process.

It should be noted that the lubricant is not limited to the exemplified type. For example, methyl caproate as the aliphatic ester may be replaced with methyl caprylate, methyl laurylate or methyl laurate. Examples of usable solvents include petroleum solvents such as isoparaffin and naphthene solvents. The lubricant may be added at any arbitrary time, including before, during or after the fine pulverization. A solid (dry) lubricant like zinc stearate may also be used instead of, or in addition to, the cutting fluid.

The magnet powder is compacted by using a known press under an aligning magnetic field applied substantially parallel to or substantially perpendicular to the press direction in the rage of about 0.5 MA/m to about 1.5 MA/m.

R—Fe—B type sintered magnets that are easily oxidized and hardly machined were used for description of the present invention. The present invention is also applicable to rare earth sintered magnets made of other materials and other sintered magnets.

In the above description, a green compact was cut. The present invention is also applicable to profile machining of a green compact in which the green compact is machined while being relatively moved with respect to a wire-saw two-dimensionally or three-dimensionally under NC control. By this machining, the green compact can be cut into an arbitrary shape such as a bow shape and a barrel shape.

According to preferred embodiments of the present invention, a comparatively soft green compact before sintering is machined with a narrow wire-saw. This decreases the machining load and also minimizes heat generation in the green compact. Therefore, even in manufacture of a magnet from magnet powder that is susceptible to oxidation, the time required for machining can be significantly shortened and the production cost can be greatly reduced without deteriorating the final magnetic properties. In addition, the cutting clearance can be reduced compared with the case of using a conventional rotary blade. This improves the yield of the material.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. A method for manufacturing a sintered magnet, comprising the steps of:
   producing a green compact of powder for the sintered magnet;
   machining the green compact with a wire-saw; and
   sintering the green compact, wherein
   the powder for the sintered magnet is powder of a R-T-B type rare earth alloy (R is at least one type of element selected from the group consisting of rare earth elements and yttrium, T is a transition metal element absolutely including iron, and B is boron).

2. The method of claim 1, wherein the wire-saw includes a wire having an outer diameter in a range of about 0.05 mm to about 3.0 mm and abrasive grains fixed to the wire.

3. The method of claim 1 or 2, wherein the step of machining the green compact comprises the step of slicing the green compact into a plurality of parts.

4. The method of claim 3, wherein the step of machining the green compact comprises the steps of slicing the green compact while forming cut surfaces by relatively moving the green compact with respect to the wire-saw, and relatively moving the wire-saw again along the cut surfaces.

5. The method of claim 3, wherein the step of machining the green compact is performed by relatively moving the green compact with respect to the wire-saw in a horizontal plane, and the method further comprises the step of separating the plurality of parts obtained in the step of slicing the green compact in a substantially perpendicular direction.

6. The method of claim 3, further comprising the step of applying anti-fusing powder to a gap between the plurality of parts after the step of machining the green compact.

7. The method of claim 1, wherein the step of machining the green compact is performed in an inert gas atmosphere having an oxygen concentration adjusted to be in a range of about 5% to about 13% in mole ratio.

8. The method of claim 1, wherein, the step of machining the green compact is performed with a cutting fluid applied to at least a portion of the wire-saw that contacts the green compact.

9. The method of claim 8, wherein the cutting fluid includes a hydrocarbon base organic solvent.

10. The method of claim 9, wherein the hydrocarbon base solvent includes isoparaffin.

11. The method of claim 8, wherein the cutting fluid is a dispersion containing anti-fusing powder.

12. The method of claim 8, wherein the cutting fluid is applied to the wire-saw by immersion, dropping or spraying.

13. The method of claim 8, wherein the green compact is machined in the cutting fluid.

14. The method of claim 1, wherein the step of producing a green compact comprises the step of adding a lubricant to the powder for the sintered magnet.

15. The method of claim 1, wherein the powder for the sintered magnet has residual magnetization in a range of about 0.001 T to about 0.1 T.

* * * * *